United States Patent
Campbell

(10) Patent No.: US 6,591,423 B1
(45) Date of Patent: Jul. 8, 2003

(54) GATEWAY POWER SYNCHRONIZATION

(75) Inventor: Kurt A. Campbell, Lafayette, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/514,756

(22) Filed: Feb. 28, 2000

(51) Int. Cl.$^7$ .............................. H04N 7/173; H04J 3/16
(52) U.S. Cl. .................. 725/119; 725/120; 725/96; 725/97; 370/395.41; 370/395.42; 370/437
(58) Field of Search ................................ 725/119, 120, 725/80, 81, 95, 96, 97, 74, 78, 82, 84, 85, 131, 151, 141; 348/734; 709/231, 232, 233; 370/395.41, 395.42, 437

(56) References Cited

U.S. PATENT DOCUMENTS

| | | | | |
|---|---|---|---|---|
| 5,014,125 A | * | 5/1991 | Pocock et al. ................. | 725/93 |
| 5,031,213 A | * | 7/1991 | Kawasaki ..................... | 725/31 |
| 5,532,753 A | * | 7/1996 | Buchner et al. .............. | 725/56 |
| 5,715,020 A | * | 2/1998 | Kuroiwa et al. ............. | 348/734 |
| 5,907,321 A | * | 5/1999 | Grossman et al. ............. | 725/32 |
| 6,014,694 A | * | 1/2000 | Aharoni et al. .............. | 709/219 |
| 6,049,653 A | * | 4/2000 | Furrey et al. ................. | 386/83 |
| 6,205,318 B1 | * | 3/2001 | Schindler et al. ........... | 455/3.06 |
| 6,219,409 B1 | * | 4/2001 | Smith et al. ........... | 379/106.09 |
| 6,247,090 B1 | * | 6/2001 | Arai et al. ...................... | 710/9 |
| 6,324,184 B1 | * | 11/2001 | Hou et al. ................... | 370/468 |

\* cited by examiner

Primary Examiner—John Miller
Assistant Examiner—Annan Q. Shang
(74) Attorney, Agent, or Firm—Townsend and Townsend and Crew LLP

(57) ABSTRACT

A system for receiving network video includes a remote control with a power control input. A video receiver, controlled by the remote control, powers up or powers down based on a control signal indicating activation of the power control input. The video receiver receives video signals from a gateway or gateway source connected to the video network. The gateway decodes signals received from the network into a format acceptable by the receiver. If the gateway receives a control signal from the remote control indicating activation of the power control input and the gateway is currently in the "on" state, the gateway toggles to the "off" state and outputs a predefined channel to the receiver.

21 Claims, 3 Drawing Sheets

GATEWAY POWER SYNCHRONIZATION

TECHNICAL FIELD

The present invention relates to gateways in video distribution networks.

BACKGROUND ART

Video distribution networks deliver entertainment and educational content from one or more central locations to many customer premises. The video distribution network includes distribution centers, with each distribution center serving a cluster of customer locations. If the video distribution system is a broadcast system, the bandwidth requirements of distribution lines feeding distribution centers remains fairly constant over short time intervals. If the video distribution system is switched, video signals received by the distribution center depend, in part, on the demand generated by serviced customers.

Each customer premise includes a gateway connected to the servicing distribution center. The gateway receives network signals from the distribution center and forwards video signals to one or more video receivers at the customer location. The gateway may modify network signals to suit particular format requirements for each receiver. The gateway may include one or more gateway sources each generating video signals for one or more receivers.

A single remote control is often provided to operate both the gateway and one or more receivers. This remote control simplifies control operations and makes equipment control more convenient for the customer. Typically, this remote control has a single button for controlling the power state of both the gateway and the receiver. While this simplifies equipment operation, the use of a single button can create problems in certain circumstances. In particular, if a control signal indicating activation of the power control input is blocked from either the gateway or the receiver, one device will be on and the other off. Subsequent assertions of the power control input will toggle both devices creating a continuous "blank" screen on the receiver.

In addition to creating a potentially puzzling situation for the customer, turning the receiver off while leaving the gateway on and switched to the last channel viewed by the customer creates an additional problem. In particular, the gateway still requests video delivery from the distribution center. This wastes bandwidth on the distribution line feeding the distribution center if no other customer serviced by the distribution center is also viewing the same channel.

What is needed is to handle power control signals at the gateway in a manner that does not inconvenience the customer even when such a control signal is not appropriately received by either the gateway or the receiver. Gateway power control so adapted should not require extensive modification of video distribution network equipment.

DISCLOSURE OF INVENTION

It is an object of the present invention to provide power input control to gateways and receivers located on customer premises.

It is another object of the present invention to provide convenient recovery when a power control input signal, sent from a remote control to a gateway and receiver, is received by one device and not the other.

It is still another object of the present invention to provide a video distribution gateway with greater functionality in the "off" state.

It is yet another object of the present invention to provide a video distribution network with reduced distribution line bandwidth requirements.

In carrying out the above objects and other objects and features of the present invention, a system for receiving networked video is provided. The system includes a remote control transmitting a control signal indicating when a power control input is activated. A video receiver is controlled by the remote control. The video receiver powers up or powers down based on the received control signal indicating activation of the power control input. A gateway receives signals from the network representing at least one video channel. The gateway decodes or transforms signals received from the network into a predefined video format acceptable to the receiver. When the gateway receives a control signal transmitted by the remote control, the gateway determines if the control signal indicates activation of the power control input. If the control signal indicates activation of the power control signal and if the gateway is currently in an on state, the gateway toggles to an off state and outputs a predefined channel to the receiver.

In various embodiments of the present invention, the predefined channel includes at least one of vertical blanking interval information, emergency alert system information, and channel content information. The gateway may include a timer turning the gateway to an on state for a predetermined period of time at regular intervals.

A method for power synchronization between a networked gateway or gateway source and one or more video receivers is also provided. The gateway or gateway source and the receiver are controlled by a remote control having a plurality of control inputs including a power control input. The method includes receiving a signal from the remote control indicating that a control input was activated. If the gateway or gateway source is in the on state, the gateway or gateway source is changed to the off state. A predefined channel is transmitted to the video receiver if the control input was the power control input and if the gateway or gateway source is in the off state.

A method for reducing bandwidth utilization in a switched video distribution network is also provided. The network includes customer sites, each site having at least one receiver and a gateway. Each gateway or gateway source decodes or transforms at least one requested channel to produce video signals for use by each receiver. Each gateway is connected with a distribution center which receives requested channels over a distribution line. The bandwidth of the distribution line is reduced by switching each gateway or gateway source to a predefined channel when receivers serviced by the gateway are turned off.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
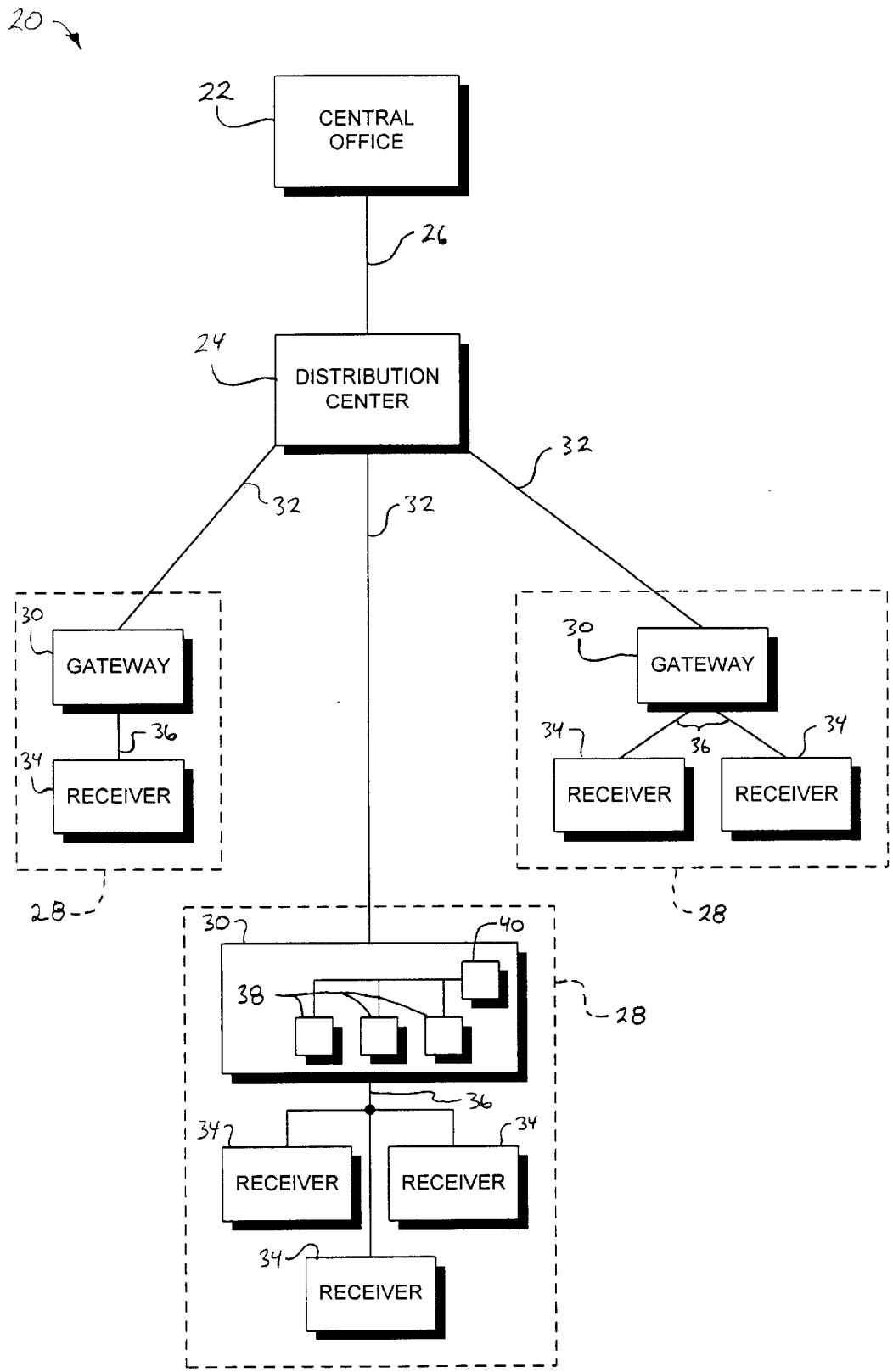
FIG. 1 is a block diagram illustrating a video distribution network according to an embodiment of the present invention.

Referring to FIG. 1, a block diagram illustrating a video distribution network according to an embodiment of the present invention is shown. A video distribution network, shown generally by 20, includes at least one central office 22 generating or supplying video content signals. Distribution centers, one of which is indicated by 24, are connected to central office 22 through distribution line 26. Distribution center 24 services a plurality of customer sites 28. Each customer site 28 includes gateway 30 for receiving network signals 32 from distribution center 24. Customer site 28 also includes one or more receivers 34 receiving video signals 36 from gateway 30. Receiver 34 may be a television, computer, video recording device, or the like.

Gateway 30 decodes or transforms network signals 32 to produce video signals 36 in a format acceptable by receiver 34. Formats include analog, digital, HDTV, and the like. Gateway 30 may include one or more gateway sources 38, each gateway source 38 providing a separate video signal 36. For example, if receivers 34 accept analog video signals 36, gateway sources 38 may each modulate analog video signals 36 to a different channel frequency. Also, two or more gateway sources may be used to produce "picture-in-picture" displays on receiver 34. Preferably, gateway 30 includes standard decoding circuitry and algorithms such as, for example, those corresponding to an MPEG standard.

Typically, if each receiver 34 serviced by gateway 30 or gateway source 38 are off, gateway 30 or gateway source 38 is shut off. There are, however, several reasons why gateway 30 or gateway source 38 might be left continuously on. First, analog receivers 34 may use information contained within the video blanking interval (VBI) even when receiver 34 is "off." VBI information may be used by receiver 34 for a variety of purposes including constructing and maintaining channel content listings. Typically, content information may be carried in the VBI for more than one station or channel. In an embodiment of the present invention, gateway 30 includes a timer 40 that may temporarily enable gateway 30 or gateway sources 38 to feed one or more stations or channels to receivers 34 at regular intervals. Thus, each receiver 34 has complete and updated channel content listings.

A second reason to leave gateway 30 or gateway source 38 on is to support an emergency alert system (EAS). EAS information is broadcast during national or local emergencies to indicate the type of emergency and appropriate civilian actions required by the emergency. Gateway 30 may be operative to broadcast EAS information or may automatically activate receiver 34 and forward the EAS information to receiver 34 for display.

A third reason for leaving gateway 30 or gateway source 38 switched on is to permit gateway 30 to continuously receive network signals 32. This would permit gateway 30 to provide a variety of services including continuously updated channel content information, electronic mail notification, system status, and the like.

One disadvantage with leaving gateway 30 or gateway sources 38 switched on is the potential for unnecessary increase in bandwidth if video distribution network 20 is a switched video system. Distribution center 24 supplies the content for all network signals 32 requested by gateways 30 for display on receivers 34. One copy of each requested signal is sent down distribution line 26. If receiver 34 is turned off without notifying gateway 30, gateway 30 or gateway source 38 continues to request network signals 32 corresponding to the channel last displayed on receiver 34. This results in unnecessary bandwidth utilization on distribution line 26 if no other receiver 34 serviced by distribution center 24 is displaying the same channel.

By switching each gateway 30 or gateway source 38 to a predefined channel for receiver 34 when receiver 34 is turned off, unnecessary bandwidth utilization in distribution line 26 is eliminated. This predefined channel may include VBI information, EAS information, channel content information, and the like. Bandwidth reduction results if the predefined channel requires less bandwidth than standard video channels. Bandwidth reduction also results from a decrease in the number of channels transmitted through distribution line 26.

Figure 2:
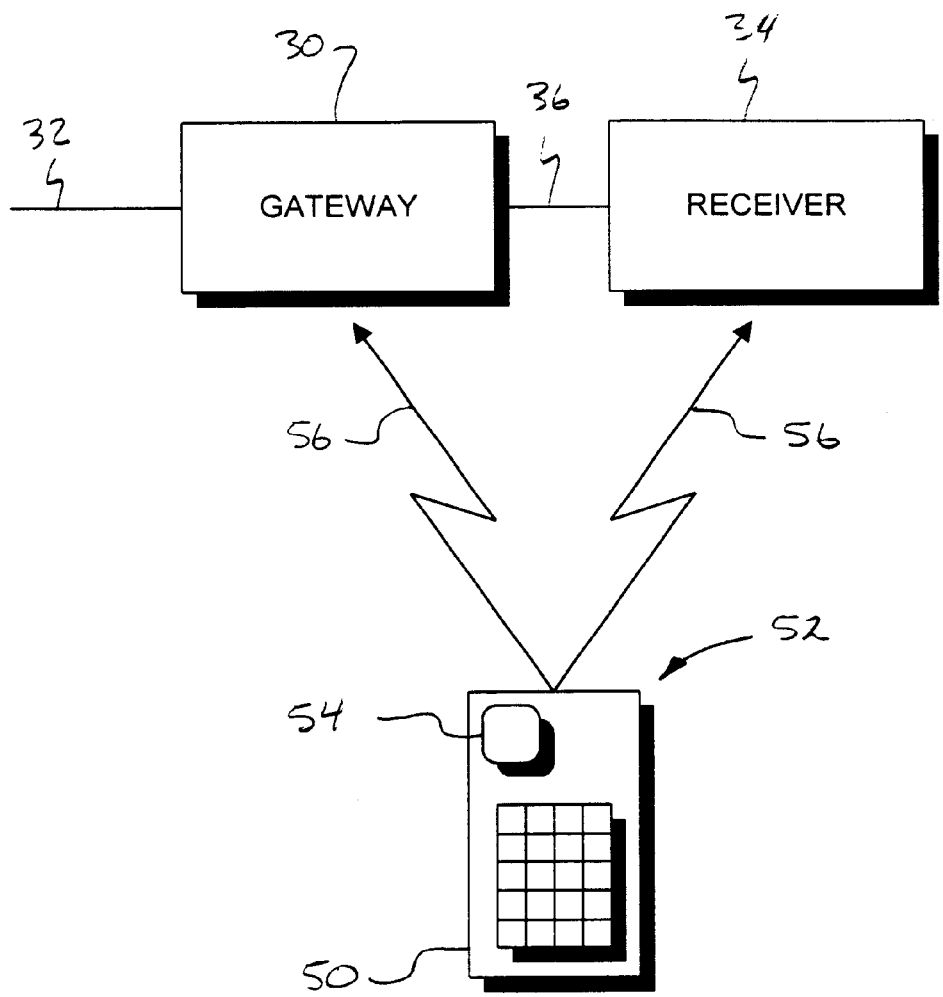
FIG. 2 is a block diagram illustrating a remote control controlling a gateway and a receiver according to an embodiment of the present invention.

Referring now to FIG. 2, a block diagram illustrating a remote control controlling a gateway and a receiver according to an embodiment of the present invention is shown. Remote control 50 includes a plurality of controls, indicated by 52, including power control input 54. Typically, power control input 54 is a push button. When any of controls 52 are activated, remote control 50 transmits control signal 56. Control signal 56 may use any medium known in the art, including infrared signals, ultrasonic signals, audible signals, and the like, but preferably uses radio signals. Control signals 56 are received by both gateway 30 and receiver 34. Each unit 30, 34 interprets control signal 56 to determine what action is required. If gateway 30 includes a plurality of gateway sources 38, each gateway source 38 may have its own remote control 50.

If control signal 56 indicates activation of power control input 54, gateway 30 and receiver 34 toggle their power state. If either device appears to be operating, it changes to a state where it appears to be off. If either device is off, it changes to a state where it appears to be operating. The terms "on" and "off" are used to express these states even though one of skill in the art recognizes that some circuitry may remain powered and working in either state. A problem arises if control signal 56 is received by one device 30, 34 but not the other device 30, 34. For example, if both devices are currently "on" and receiver 34 receives control signal 56 indicating power control input 54 has been asserted, receiver 34 will change to its "off" state. The next time power control input 54 is asserted, receiver 34 will turn "on" and gateway 30 will turn "off." Receiver 34 will still display a blank screen if gateway 30 is actually turned "off." To prevent this problem, gateway 30 does not actually turn "off." When gateway 30 is "on" and receives control signal 56 indicating the assertion of power control input 54, gateway 30 decodes network signals 32 corresponding to a predefined channel and displays this predefined channel as video signals 36 to receiver 34. Hence, if gateway 30 is in the "off" state and receiver 34 is "on," receiver 34 displays a non-blank image. In a preferred embodiment, this image indicates to anyone watching receiver 34 that gateway 30 is currently in its "off" state. The display should be portray a recognizable state to the user. This permits the user to recover from any situation.

Figure 3:
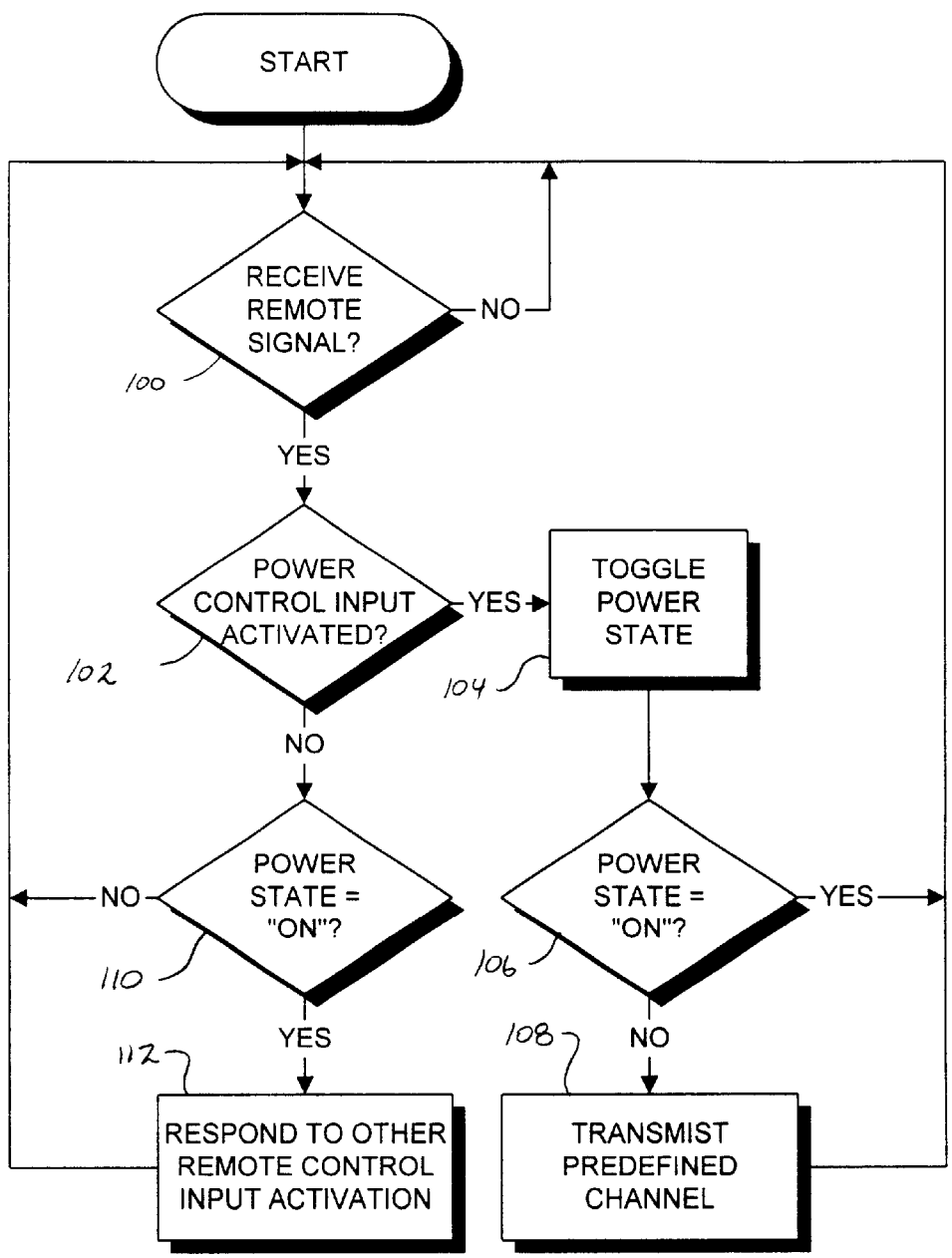
FIG. 3 is a flow chart illustrating a method for gateway and receiver power synchronization according to an embodiment of the present invention.

Referring now to FIG. 3, a flow chart illustrating a method for gateway and receiver power synchronization according to an embodiment of the present invention is shown. As will be appreciated by one of ordinary skill in the art, the operations illustrated in the flow diagram are not necessarily sequential operations. The order of steps may be modified within the spirit and scope of the present invention. The present invention transcends any particular implementation and the embodiment is shown in sequential flow chart form for ease of illustration.

A check is made to see if gateway 30 or gateway source 38 has received control signal 56 from remote control 50 in block 100. If so, a check is made to see if power control input 54 was activated in block 102. If power control input 54 was activated, the power state of gateway 30 or gateway source 38 is toggled in block 104. If gateway 30 or gateway source 38 was previously in the "on" state, it is changed to the "off" state. If gateway 30 or gateway source 38 was previously in the "off" state, it is changed to the "on" state. A check is then made to see if the power state of gateway 30 or gateway source 38 is "on" in block 106. If not, the predefined channel is transmitted from gateway 30 or gateway source 38 to receiver 34 in block 108. In either case, waiting for the next control signal 56 from remote 50 continues in block 100.

If the check to determine if power control input 54 was activated in block 102 indicated that some other control 52 was activated, a check is made to see if the power state of gateway 30 or gateway source 38 is "on" in block 110. If so, gateway 30 or gateway source 38 responds to the activation of other controls 52 on remote control 50 in block 112. In either case, gateway 30 or gateway source 38 then waits for the next control signal 56 from remote control 50 in block 100.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for receiving networked video comprising:
   at least one remote control transmitting a control signal indicating which of a plurality of controls was activated, the plurality of controls including a power control input;
   a video receiver controlled by the remote control, the video receiver operative to receive video signals in a video format, the video receiver further operative to power up or power down based on the received control signal indicating activation of the power control input; and
   a gateway in communication with the video receiver and a network, the gateway controlled by the remote control, the gateway operative to:
   (a) receive signals from the network representing at least one of a plurality of video channels;
   (b) decode the signals received from the network into the video format;
   (c) receive the control signal transmitted by the remote control;
   (d) determine if the received control signal indicates activation of the power control input; and
   (e) if the determined control signal indicates activation of the power control signal and if the gateway is currently in an on state, toggle the gateway to an off state and output a predefined channel in the predefined video format to the receiver.

2. A system as in claim 1 wherein the predefined channel comprises vertical blanking interval (VBI) information.

3. A system as in claim 1 wherein the gateway includes a timer operative to turn the gateway to an on state for a predetermined period of time.

4. A system as in claim 1 wherein the predefined channel comprises emergency alert system (EAS) information.

5. A system as in claim 1 wherein the predefined channel comprises channel content information.

6. A system as in claim 1 wherein the gateway comprises MPEG decode circuitry to decode the signals received from the network into the predefined video format.

7. A system as in claim 1 wherein the gateway comprises at least one gateway source, each gateway source receiving control signals from at least one remote control.

8. A system as in claim 1 wherein the power control input is a button, the remote control transmitting a control signal indicating activation of the power control input each time the button is asserted.

9. A method for power synchronization between a networked gateway and at least one video receiver in communication with the gateway, the gateway and each video receiver controlled by a remote control having a plurality of control inputs, the plurality of control inputs including a power control input, the method comprising:
   receiving a signal from the remote control indicating that a control input was activated;
   determining if the activated control input was the power control input;
   determining if the gateway is in an on state;
   changing the gateway to an off state if the activated control input was the power control input and if the gateway is in an on state; and
   transmitting a predefined channel to the at least one video receiver if the activated control input was the power control input and if the gateway is in the off state.

10. A method as in claim 9 further comprising extracting vertical blanking interval (VBI) information from the predefined channel.

11. A method as in claim 9 further comprising turning the gateway to an on state for a predetermined period of time at regular intervals.

12. A method as in claim 9 further comprising extracting emergency alert system (EAS) information from the predefined channel.

13. A method as in claim 9 wherein the gateway decodes a plurality of channels, the method further comprising extracting content information about the plurality of channels from the predefined channel.

14. A method as in claim 9 wherein decoding the predefined channel comprises MPEG decoding.

15. A method for reducing bandwidth utilization in a video distribution network, the video distribution network including a plurality of customer sites, each site having at least one receiver in communication with a gateway, each gateway decoding at least one requested channel to produce video signals for use by the at least one receiver, each gateway in communication with a distribution center, the distribution center receiving requested channels over a distribution line, wherein the bandwidth of the distribution line is reduced by switching each gateway to a predefined channel when the at least one receiver in communication with the gateway is turned off.

16. A method as in claim 15 further comprising extracting vertical blanking interval (VBI) information from the predefined channel in each gateway.

17. A method as in claim 15 further comprising turning the gateway to at least one predefined channel for a predetermined amount of time at regular intervals.

18. A method as in claim 15 further comprising extracting emergency alert system (EAS) information from the predefined channel in each gateway.

19. A method as in claim 15 further comprising extracting content information from the predefined channel about requestable channels in each gateway.

20. A method as in claim 15 wherein decoding at least one requested channel comprises MPEG decoding.

21. A method as in claim 15, each gateway including at least one gateway source, each gateway source operative to supply at least one receiver with video signals, wherein switching each gateway to a predefined channel when the at least one receiver in communication with the gateway is turned off comprises switching off the gateway source supplying the at least one receiver.

* * * * *